United States Patent
Lee et al.

(10) Patent No.: US 8,213,112 B2
(45) Date of Patent: Jul. 3, 2012

(54) MOTOR HAVING A PRESSURE DIFFERENCE GENERATION PORTION DISPOSED IN A SPACE BETWEEN A DISK AND ROTOR CASE AND DISK DRIVE APPARATUS INCLUDING THE MOTOR

(75) Inventors: Yong Kwan Lee, Gyunggi-do (KR); Elr Soo Youn, Gyunggi-do (KR); Soo Woong Park, Gyunggi-do (KR); Chang Keun Jun, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 221 days.

(21) Appl. No.: 12/654,415

(22) Filed: Dec. 18, 2009

(65) Prior Publication Data
US 2011/0075547 A1 Mar. 31, 2011

(30) Foreign Application Priority Data
Sep. 25, 2009 (KR) .................. 10-2009-0090876

(51) Int. Cl.
*G11B 33/14* (2006.01)
(52) U.S. Cl. .................. 360/97.13; 360/97.19
(58) Field of Classification Search ............... 360/98.08, 360/99.05, 99.12, 97.01–97.04
See application file for complete search history.

(56) References Cited

U.S. PATENT DOCUMENTS

| | | | | |
|---|---|---|---|---|
| 3,846,835 A | * | 11/1974 | Horovitz et al. | 360/97.03 |
| 4,069,503 A | * | 1/1978 | Nagaoka | 369/261 |
| 4,175,274 A | * | 11/1979 | Mann | 360/99.05 |
| 4,661,875 A | * | 4/1987 | Kinjo | 360/133 |
| 4,809,102 A | * | 2/1989 | Hatchett et al. | 360/97.03 |
| 2005/0116564 A1 | | 6/2005 | Tokunaga et al. | |

FOREIGN PATENT DOCUMENTS

| | | |
|---|---|---|
| JP | 6-68567 | 3/1994 |
| JP | 2002-251864 | 9/2002 |
| KR | 0176572 | 11/1998 |
| KR | 10-2008-0113635 | 12/2008 |

OTHER PUBLICATIONS

Korean Office Action issued Dec. 28, 2010 in corresponding Korean Patent Application 10-2009-0090876.
Japanese Office Action issued Nov. 1, 2011 in corresponding Japanese Patent Application No. 2009-286781.
Japanese Office Action issued Apr. 3, 2012 in corresponding Japanese Patent Application No. 2009-286781.

* cited by examiner

*Primary Examiner* — Allen Heinz

(57) ABSTRACT

There is provided a motor. The motor includes a shaft rotatably installed and supported by a sleeve, a rotor case coupled with the shaft and on which a disk is mounted, and a pressure difference generation portion disposed in a space between the disk and the rotor case and generating a pressure difference using airflow in the space.

11 Claims, 5 Drawing Sheets

MOTOR HAVING A PRESSURE DIFFERENCE GENERATION PORTION DISPOSED IN A SPACE BETWEEN A DISK AND ROTOR CASE AND DISK DRIVE APPARATUS INCLUDING THE MOTOR

CROSS-REFERENCE TO RELATED APPLICATIONS

This application claims the priority of Korean Patent Application No. 10-2009-0090876 filed on Sep. 25, 2009, in the Korean Intellectual Property Office, the disclosure of which is incorporated herein by reference.

BACKGROUND OF THE INVENTION

1. Field of the Invention

The present invention relates to a motor and a disk drive apparatus, and more particularly, to a motor including a pressure difference generation portion formed at a rotor case mounted on a rotor, and a disk drive apparatus including the motor.

2. Description of the Related Art

In general, a spindle motor installed inside an optical disc drive rotates a disk so that an optical pickup mechanism can read data recorded on the disk.

The performance of a spindle motor is determined by its ability to accurately adjust the position of a medium device such as a compact disk (CD) or a digital versatile disk (DVD).

According to the related art, a motor has an elastic body under a disk in order to prevent the disk from slipping out while rotating.

However, a disk mounted on the above structure is shaken more vigorously as the number of revolutions thereof increases. This causes the disk to wobble up and down severely.

Accordingly, the related art motor results in defective data input and output with regard to the disk, since disk wobble amplifies vertical displacement as the number of revolutions per minute of the disk increases. Therefore, techniques for approaching and remedying the above limitations are currently in demand.

SUMMARY OF THE INVENTION

An aspect of the present invention provides a motor capable of preventing disk wobble caused when a disk is in rotation, and a disk drive apparatus including the motor.

According to an aspect of the present invention, there is provided a motor including: a shaft rotatably installed and supported by a sleeve; a rotor case coupled with the shaft and on which a disk is mounted; and a pressure difference generation portion disposed in a space between the disk and the rotor case and generating a pressure difference using airflow in the space.

The pressure difference generation portion may include a plurality of protrusions having a quadrangular section.

The pressure difference generation portion may include a plurality of protrusions having a streamlined shape.

The pressure difference generation portion may have an uneven surface having concave and convex portions.

The motor may further include a mounting portion formed on the rotor case to contact a bottom surface of the disk.

The pressure difference generation portion may be formed on the rotor case to the inside of the mounting part.

The pressure difference generation portion may be a recess formed integrally with the mounting portion.

The mounting portion may include a plurality of mounting portions, and the plurality of mounting portions may be disposed along a circumferential direction.

According to another aspect of the present invention, there is provided a disk drive apparatus including: a motor including a shaft rotatably installed and supported by a sleeve, a rotor case coupled with the shaft and on which a disk is mounted, and a pressure difference generation portion disposed in a space between the disk and the rotor case and generating a pressure difference using airflow in the space; a base plate on which the motor is disposed; and a flexible printed circuit board disposed on the base plate and having a circuit pattern supplying power to the motor.

The pressure difference generation portion may include a plurality of protrusions having a quadrangular section.

The pressure difference generation portion may include a plurality of protrusions having a streamlined shape.

The pressure difference generation portion may have an uneven surface having concave and convex portions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
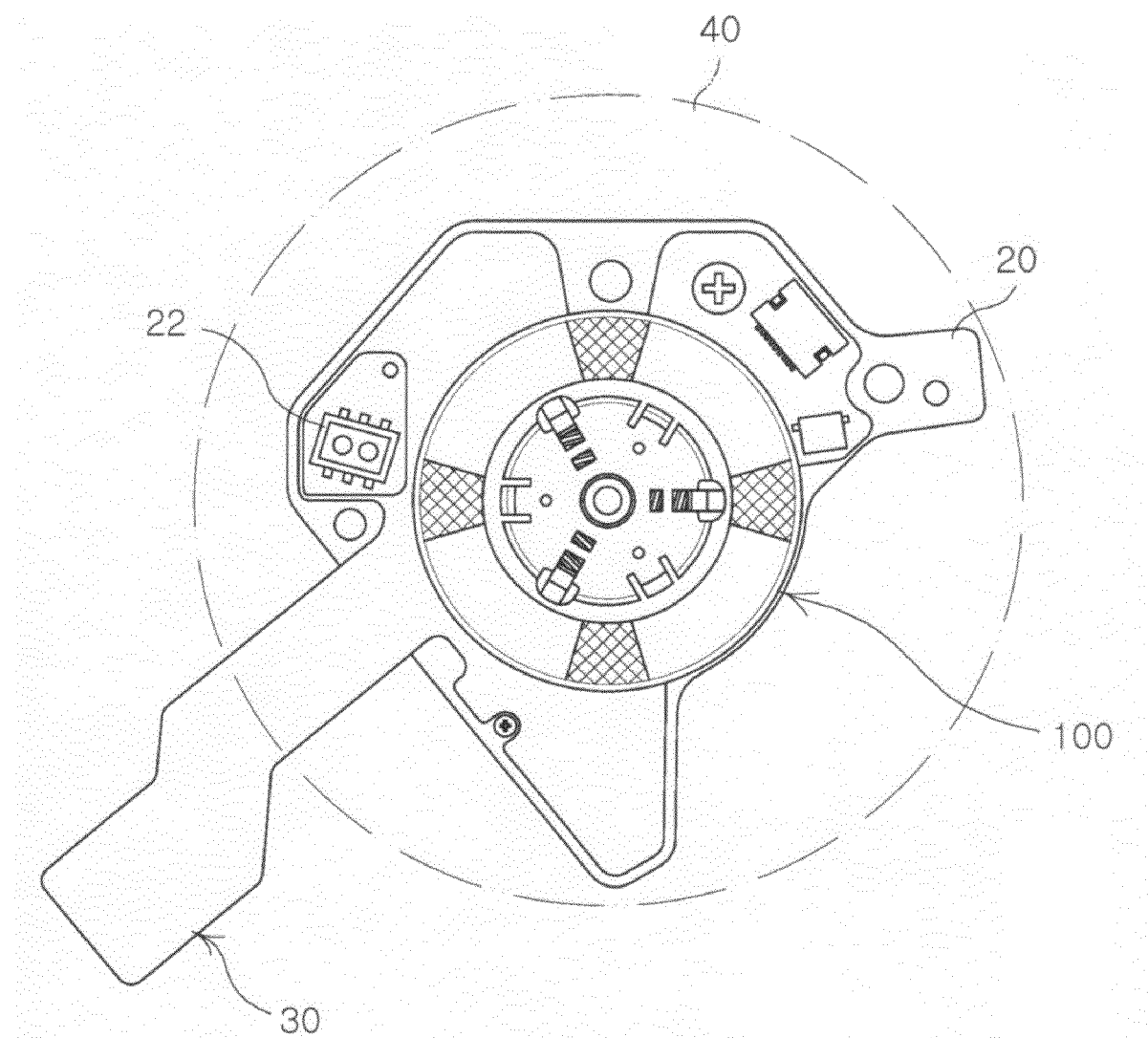
FIG. 1 is a front view illustrating a disk drive apparatus according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, like reference numerals in the drawings denote like elements.

A spindle motor according to embodiments of the present invention will now be described in more detail with reference to FIGS. 1 through 7.

Figure 2:
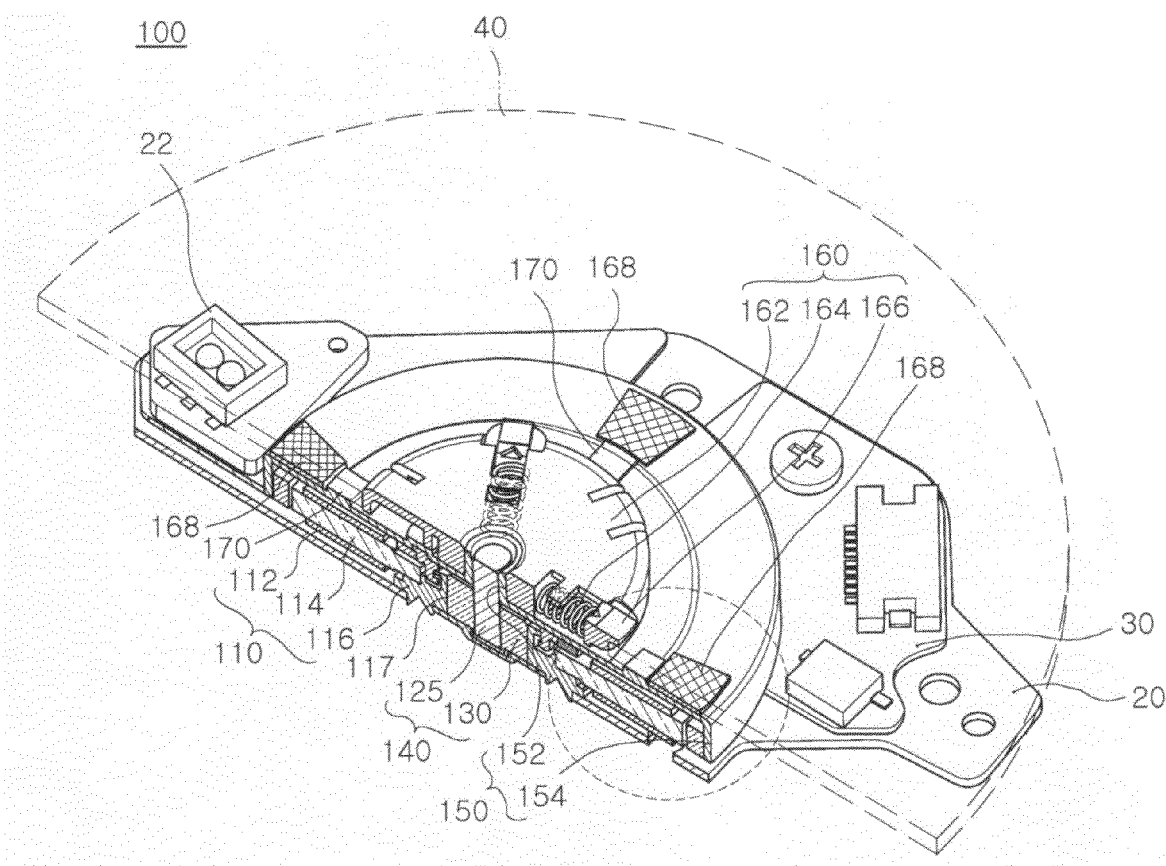
FIG. 2 is a cut-out perspective view illustrating a disk drive apparatus according to the exemplary embodiment of the present invention.
Figure 3:
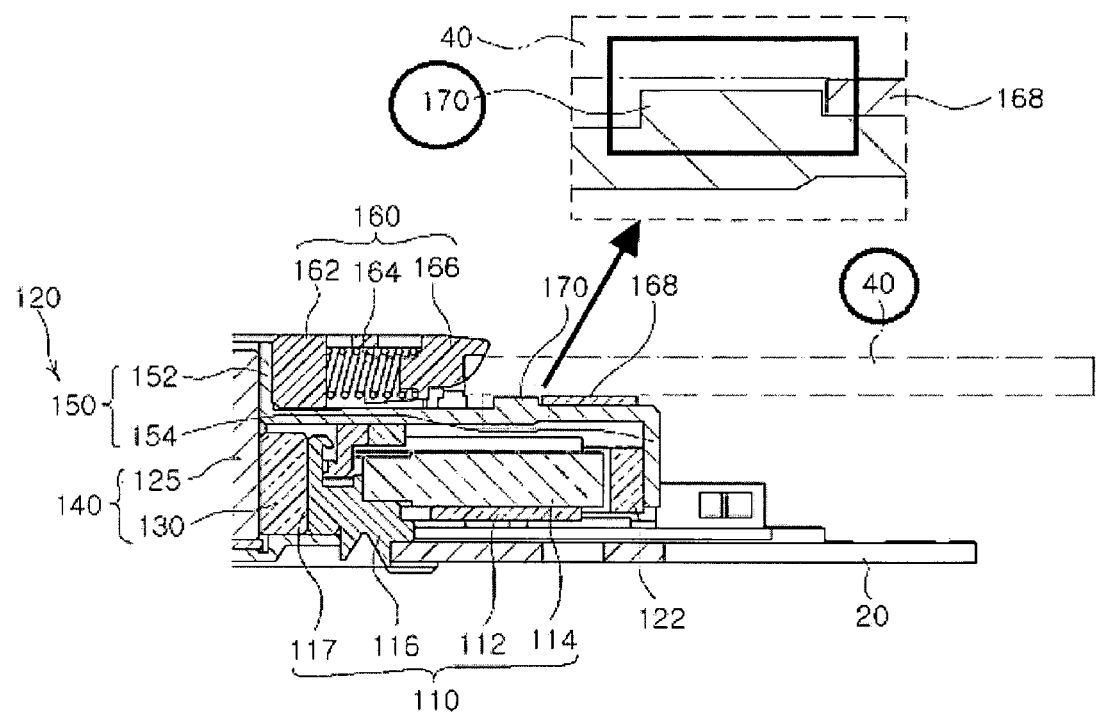
FIG. 3 is a partial cross-sectional view illustrating a disk drive apparatus according to the exemplary embodiment of the present invention.

FIG. 1 is a front view illustrating a disk drive apparatus according to an exemplary embodiment of the present invention. FIG. 2 is a cut-out perspective view illustrating the disk drive apparatus of FIG. 1. FIG. 3 is a partial cross-sectional view illustrating the disk drive apparatus of FIG. 1.

Referring to FIGS. 1 through 3, a disk drive apparatus 10 includes a base plate 20, a flexible printed circuit board 20, and a motor 100.

The base plate 20 is a support on which the motor 100 is disposed. The flexible printed circuit board 30 is provided on the base plate 20. The use of the flexible printed circuit board 30 may lead to a reduction in the thickness of the motor 100, as compared to when a printed circuit board is used.

A plurality of passive devices may be mounted on the base plate 20. Notably, a data reception part 22 may be provided to receive data from a rotating disk 40.

The flexible printed circuit board 30 may have a circuit pattern supplying power to the motor 100. A ground pattern of the flexible printed circuit board 30 may be electrically connected to the base plate 20.

The motor 100 may include a stator 110, a rotor 120, a bearing assembly 140, a rotor case 150, a disk chucking device 160, and a pressure difference generation portion 170.

The stator 110 is a fixed structure that includes a winding coil 112 generating an electromagnetic force of a predetermined magnitude when receiving power, and a plurality of cores 114 around which the winding coil 112 are wound in a radiation direction on the basis of at least one pole.

The cores 114 are fixed to the top of a base 116 provided with a substrate having a printed pattern circuit. A mounting hole 117 having a predetermined size is provided through the base 116.

A plurality of coil holes having a predetermined size may be formed through the base 116, corresponding to the winding coil 112, so that the winding coil 112 can be exposed toward the lower part. The winding coil 112 is electrically connected to a flexible board to receive external power.

The rotor 120 includes a cup-shaped rotor case 150 having an annular magnet 122 on its inner circumferential portion, and the magnet 122 corresponds to the winding coil 122 of the stator 110. Here, the magnet 122 is a permanent magnet having N poles and S poles alternated in a circumferential direction to thereby generate a magnetic force having a predetermined intensity.

The rotor case 150 includes a rotor hub 152 fittingly inserted onto a shaft 125 and coupled thereto, and a magnet coupling portion 154 having an inner surface on which the annular magnet 122 is disposed. The rotor hub 152 is disposed around the upper portion of the shaft 125 in an axial direction so as to maintain an un-mating force with respect to the shaft 125. The disk chucking device 160 for mounting a disk 40 may be coupled to the outer circumferential surface of the rotor hub 152.

The bearing assembly 140 may include the shaft 125 being concentric with the rotation axis of the rotor 120, and a sleeve 130 having a shaft recess in which the shaft 125 is disposed.

As shown in FIG. 3, the sleeve 130 may be assembled by fittingly inserting the lower body portion of the sleeve 130 into the mounting hole 117 of the stator 110. The sleeve 130 is a rotation support member that is placed at a predetermined distance from the rotor 120 to thereby form a slide-way therebetween.

The disk chucking device 160 is coupled with one end portion of the rotor 120. A disk 40 is detachably coupled to the disk chucking device 160. The disk chucking device 160 includes a chuck base 162, a spring 164 and a chuck chip 166.

The chuck base 162 has a center hole at its central portion, and one end portion of the rotor 120 is inserted into the center hole so that the chuck base 162 can be coupled with the motor 100.

The chuck chip 166 is received in the chuck base 162, and may protrude to the outside of the chuck base 162. The spring 164 elastically supports the chuck chip 166 in an outward direction of the chuck base 162, so that the chuck base 162 protrudes to the outside.

When the disk 40 is mounted, a part of the chuck base 162 is inserted in the inner circumferential surface of the disk 40, and the chuck chip 166 is then laid on the inner circumferential surface of the disk 40. In the above manner, the disk can be detachably coupled to the disk drive apparatus 10.

The pressure difference generation portion 170 is formed integrally with the rotor case 150, and may protrude upwardly. Here, the pressure difference generation portion 170 may be disposed to the inside of a mounting portion 168.

The mounting portion 168 is placed so as to contact the bottom of a disk 40 being mounted. The mounting portion 168 serves to prevent the disk 40 from being pushed when rotating, and to protect the disk 40 from external shocks.

Furthermore, as shown in FIG. 2, the mounting portion 168 may be include a plurality of mounting portions disposed along a circumferential direction. In this case, when the disk 40 rotates, channels that render the airflow smooth may be provided between the mounting portions 168. However, the mounting portion 168 is not limited to the disclosed placement, and may be successively formed along the circumferential direction.

Moreover, the mounting portion 168 and the pressure difference generation portion 170 are not limited to being separately formed. The pressure difference generation portion 170 may provided in the form of a recess in the top portion of the mounting portion 168 according to a designer's intention. Since the pressure difference generation portion 170 is mounted on the mounting portion 168, it can be provided in a simple manner.

Figure 4:
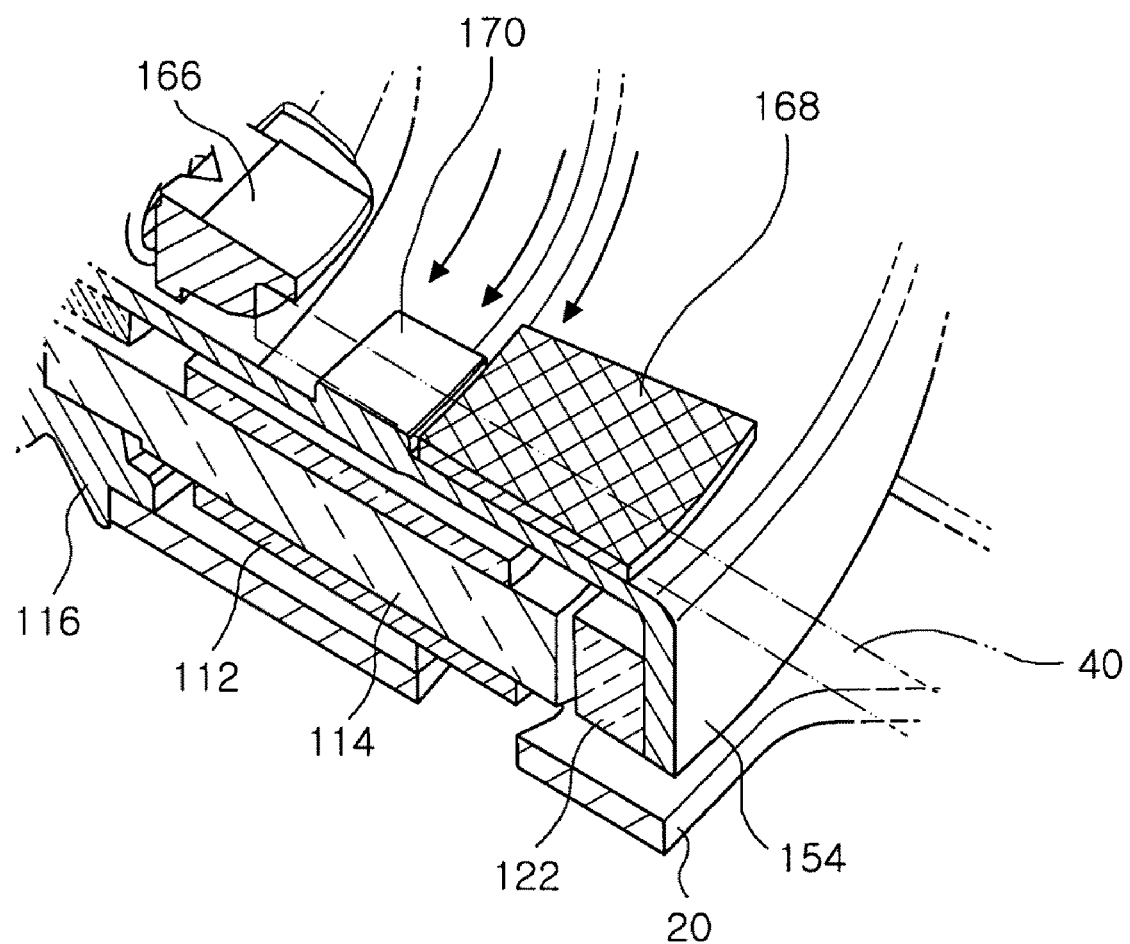
FIG. 4 is a partial perspective view illustrating a pressure difference generation portion of a motor according to the exemplary embodiment of the present invention.
Figure 5:
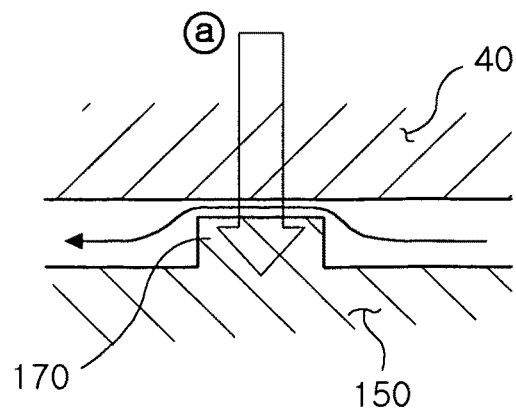
FIG. 5 is a partial cross-sectional view illustrating a pressure difference generation portion of a motor according to the exemplary embodiment of the present invention.

FIG. 4 is a partial perspective view illustrating a pressure difference generation portion of a motor according to an exemplary embodiment of the present invention, and FIG. 5 is a partial cross-sectional view illustrating the motor depicted in FIG. 4.

Referring to FIGS. 4 and 5, the pressure difference generation portion 170 is formed to be in close contact with the disk 40 being mounted. The airflow (see arrows in the drawing) accelerates rapidly at a portion where the pressure difference generation portion 170 is formed.

According to the relationship between pressure and speed, the pressure decreases as the speed increases. Thus, in actuality, constant pressure is applied toward the lower portion of the disk 40 by increasing a pressure differential between the top and bottom surfaces of the disk 40 as indicated by ⓐ in FIG. 5.

As described above, in the motor and the disk drive apparatus according to this embodiment, the pressure difference generation portion 170 placed in a space between the disk 40 and the rotor case 150 generates a pressure difference using the airflow in the space. This pressure difference allows the disk 40 to firmly contact the rotor case 150, thereby minimizing disk wobble occurring when the disk is rotation.

Since the disk wobble is minimized, a data exchange between the disk 40 and the data reception part 22 is facilitated when the disk 40 rotates, thereby enhancing product competitiveness.

Figure 6:
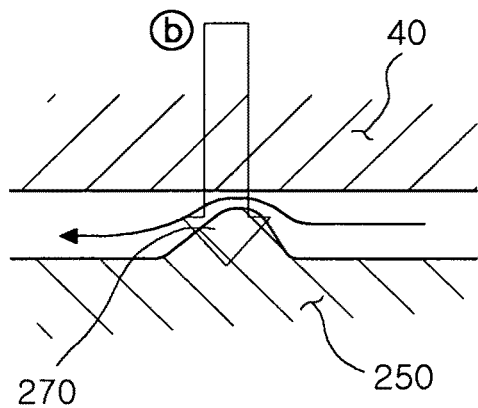
FIG. 6 is a partial cross-sectional view illustrating a pressure difference generation portion of a motor according to another exemplary embodiment of the present invention.

FIG. 6 is a partial cross-sectional view illustrating a pressure difference generation portion of a motor according to another exemplary embodiment of the present invention.

The motor, according to this embodiment, may include the stator 110, the rotor 120, the bearing assembly 140, a rotor case 250, the disk chucking device 160 and a pressure difference generation portion 270.

The stator 110, the rotor 120, the bearing assembly 140, the rotor case 250 and the disk chucking device 160 all have the same construction as in the previous embodiment. Therefore, detailed descriptions and illustrations thereof may be omitted.

As shown in FIG. 6, the pressure difference generation portion 270 may include a plurality of protrusions having a streamlined section. Notably, one side of the pressure difference generation portion 270 placed at an air inlet side (see an arrow in the drawing) may have a steeper slope, while the other side thereof placed at an air outlet side may have a gentler slope.

The degree of pressure-difference caused by the pressure difference generation portion 270 may be adjusted as desired by modifying the shape of the pressure difference generation portion 270.

In the motor and the disk drive apparatus according to this embodiment, the pressure difference generation portion 270 allows the disk 40 to firmly contact the rotor case 250 as indicated by ⓑ in FIG. 6, so that disk wobble occurring when the disk is in rotation can be minimized.

Figure 7:
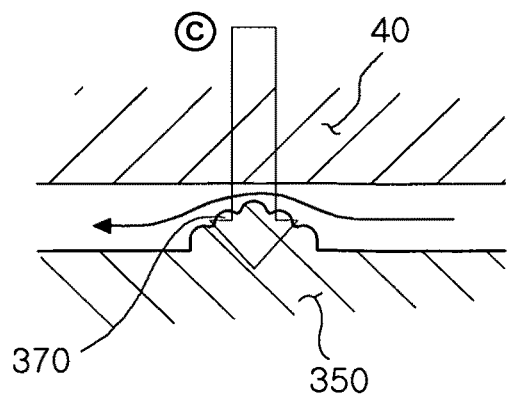
FIG. 7 is a partial cross-sectional view illustrating a pressure difference generation portion of a motor according to another exemplary embodiment of the present invention.

FIG. 7 is a partial cross-sectional view illustrating a pressure difference generation portion of a motor according to another exemplary embodiment of the present invention.

Referring to FIG. 7, a pressure difference generation portion 370 may have an uneven surface having concave and convex portions.

Since a plurality of concave and convex portions are formed in the surface of the pressure difference generation portion 370, a pressure difference may be generated within the pressure difference generation portion 370. The degree of pressure-difference caused by the pressure difference generation portion 370 may be adjusted as desired by modifying the shape of the pressure difference generation portion 270.

As a result, in the motor and the disk drive apparatus according to this embodiment, the pressure difference generation portion 370 allows the disk 40 to firmly contact the rotor case 350 as indicated by ⓒ in FIG. 7, so that disk wobble occurring when the disk is in rotation can be minimized.

Accordingly, an increase in the number of motor revolutions does not worsen the vibration of the disk due to the wobbling, but increases the force that holds the disk stably, so that the bottom of the disk 40 can be in closer contact with the mounting portion.

As set forth above, according to the motor and the disk drive apparatus according to exemplary embodiments of the invention, a pressure difference generation portion is disposed in a space between a disk and a rotor case and generates a pressure difference using airflow in the space. Accordingly, a pressure difference between the top and bottom surfaces of the disk causes a disk to firmly contact the rotor case, and the disk wobble occurring when the disk is in rotation can be minimized accordingly.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
    a shaft rotatably installed and supported by a sleeve;
    a rotor case coupled with the shaft and on which a disk is mounted;
    a mounting portion formed on the rotor case to contact a bottom surface of the disk; and
    a pressure difference generation portion disposed between the disk and the rotor case and being spaced from the disk, the pressure difference generation portion generating a pressure difference using airflow in the space for providing a pulling force between the mounting portion and the disk.

2. The motor of claim 1, wherein the pressure difference generation portion comprises a plurality of protrusions having a quadrangular section.

3. The motor of claim 1, wherein the pressure difference generation portion comprises a plurality of protrusions having a streamlined shape.

4. The motor of claim 1, wherein the pressure difference generation portion has an uneven surface having concave and convex portions.

5. The motor of claim 1, wherein the pressure difference generation portion is formed as a protrusion on a upper surface of the rotor case protruding toward the disk.

6. The motor of claim 1, wherein the pressure difference generation portion is formed on the rotor case to inner diameter direction of the mounting portion.

7. The motor of claim 1, wherein the mounting portion comprises a plurality of mounting portions, and the plurality of mounting portions are disposed along a circumferential direction.

8. A disk drive apparatus comprising:
    a motor comprising:
    a shaft rotatably installed and supported by a sleeve;
    a rotor case coupled with the shaft and on which a disk is mounted;
    a mounting portion formed on the rotor case to contact a bottom surface of the disk;
    a pressure difference generation portion disposed between the disk and the rotor case and being spaced from the disk, the pressure difference generation portion generating a pressure difference using airflow in the space for providing a pulling force between the mounting portion and the disk;
    a base plate on which the motor is disposed; and
    a flexible printed circuit board disposed on the base plate and having a circuit pattern supplying power to the motor.

9. The disk drive apparatus of claim 8, wherein the pressure difference generation portion has an uneven surface having concave and convex portions.

10. The disk drive apparatus of claim 8, wherein the pressure difference generation portion comprises a plurality of protrusions having a quadrangular section.

11. The disk drive apparatus of claim 8, wherein the pressure difference generation portion comprises a plurality of protrusions having a streamlined shape.

* * * * *

UNITED STATES PATENT AND TRADEMARK OFFICE
CERTIFICATE OF CORRECTION

| | | |
|---|---|---|
| PATENT NO. | : 8,213,112 B2 | Page 1 of 1 |
| APPLICATION NO. | : 12/654415 | |
| DATED | : July 3, 2012 | |
| INVENTOR(S) | : Yong Kwan Lee et al. | |

It is certified that error appears in the above-identified patent and that said Letters Patent is hereby corrected as shown below:

Column 6, Line 30, In Claim 6, delete "to" and insert -- to an --, therefor.

Signed and Sealed this
Second Day of October, 2012

David J. Kappos
*Director of the United States Patent and Trademark Office*